United States Patent
Myung et al.

(10) Patent No.: US 12,425,093 B2
(45) Date of Patent: Sep. 23, 2025

(54) METHOD AND APPARATUS FOR SIGNAL TRANSMISSION AND RECEPTION IN COMMUNICATION SYSTEM

(71) Applicant: Electronics and Telecommunications Research Institute, Daejeon (KR)

(72) Inventors: Jung Ho Myung, Daejeon (KR); Young-Jo Ko, Daejeon (KR); Keun Young Kim, Daejeon (KR); Kapseok Chang, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 459 days.

(21) Appl. No.: 18/091,027

(22) Filed: Dec. 29, 2022

(65) Prior Publication Data

US 2024/0097770 A1    Mar. 21, 2024

(30) Foreign Application Priority Data

Sep. 19, 2022  (KR) .......................... 10-2022-0118116
Dec. 28, 2022  (KR) .......................... 10-2022-0187909

(51) Int. Cl.
*H04B 7/08*    (2006.01)

(52) U.S. Cl.
CPC .................................... *H04B 7/08* (2013.01)

(58) Field of Classification Search
CPC ....... H04B 7/08; H04L 1/0045; H04W 88/085
See application file for complete search history.

(56) References Cited

U.S. PATENT DOCUMENTS

| | | |
|---|---|---|
| 7,418,053 B2 | 8/2008 | Perlman et al. |
| 8,457,265 B2 | 6/2013 | Sampath |
| 8,630,379 B1 | 1/2014 | Sun et al. |

(Continued)

FOREIGN PATENT DOCUMENTS

| | | |
|---|---|---|
| KR | 10-2013-0129973 | 11/2013 |
| KR | 10-1468910 | 12/2014 |

(Continued)

OTHER PUBLICATIONS

Ngo et al., "Cell-Free Massive MIMO Versus Small Cells", IEEE Transations on Wireless Communications, Mar. 2017, pp. 1834-1850, vol. 16, No. 3.

*Primary Examiner* — Yuwen Pan
*Assistant Examiner* — Rui M Hu
(74) *Attorney, Agent, or Firm* — KILE PARK REED & HOUTTEMAN PLLC

(57) ABSTRACT

An operation method of a first access point (AP) may comprise: transmitting, to a control device of a base station, channel information between the first AP and one or more user equipments (UEs) connected to the base station; receiving allocation information determined by the control device; identifying an entity to decode a uplink (UL) signal of each of the one or more UEs from among a plurality of APs and the control device constituting the base station, based on the allocation information; directly performing a decoding operation on a first UL signal received from a first UE among the one or more UEs, based on the allocation information; and transmitting, to the control device, a first report related to a result of the decoding operation on the first UL signal.

15 Claims, 9 Drawing Sheets

(56) References Cited

U.S. PATENT DOCUMENTS

| | | |
|---|---|---|
| 8,767,672 B2 | 7/2014 | Soomro et al. |
| 9,319,197 B2 | 4/2016 | Sahin et al. |
| 9,386,556 B2 | 7/2016 | Park et al. |
| 10,237,023 B2 | 3/2019 | Lim et al. |
| 2012/0134449 A1* | 5/2012 | Chen ..................... H04L 1/0052 375/340 |
| 2012/0281554 A1* | 11/2012 | Gao ..................... H04L 5/0053 370/252 |
| 2013/0195080 A1* | 8/2013 | Kang .................. H04L 1/0031 370/335 |
| 2013/0294388 A1* | 11/2013 | Kawasaki ............. H04L 1/0045 370/329 |
| 2015/0351121 A1* | 12/2015 | Luo ................... H04W 72/1273 370/329 |
| 2016/0338129 A1* | 11/2016 | Moulsley .................. H04L 1/18 |
| 2017/0111090 A1 | 4/2017 | Nam et al. |
| 2019/0132822 A1 | 5/2019 | Kim et al. |
| 2019/0289633 A1* | 9/2019 | Fang ................... H04L 27/2601 |
| 2019/0364492 A1 | 11/2019 | Azizi et al. |
| 2020/0305103 A1* | 9/2020 | Chen ................... H04W 56/001 |
| 2020/0382966 A1* | 12/2020 | Hanson ............. H04B 7/15528 |
| 2021/0243617 A1* | 8/2021 | Cooper ............... H04L 27/2607 |
| 2022/0086027 A1 | 3/2022 | Song |
| 2022/0394508 A1 | 12/2022 | Kim et al. |
| 2023/0156807 A1* | 5/2023 | Lei ........................ H04W 72/12 370/329 |
| 2024/0008040 A1* | 1/2024 | Kwak ................... H04L 1/1848 |
| 2024/0205732 A1* | 6/2024 | Cariou ................. H04L 47/2441 |

FOREIGN PATENT DOCUMENTS

| | | |
|---|---|---|
| KR | 10-1598324 | 2/2016 |
| KR | 10-2022-0036356 | 3/2022 |
| KR | 10-2022-0104188 | 7/2022 |
| WO | 2012/050364 | 4/2012 |
| WO | 2017/183780 | 10/2017 |

* cited by examiner

METHOD AND APPARATUS FOR SIGNAL TRANSMISSION AND RECEPTION IN COMMUNICATION SYSTEM

CROSS-REFERENCE TO RELATED APPLICATIONS

This application claims priority to Korean Patent Applications No. 10-2022-0118116, filed on Sep. 19, 2022, and No. 10-2022-0187909, filed on Dec. 28, 2022, with the Korean Intellectual Property Office (KIPO), the entire contents of which are hereby incorporated by reference.

BACKGROUND

1. Technical Field

The present disclosure relate to a technique for radio signal transmission and reception in a communication system, and more specifically, to a technique for radio signal transmission and reception for improving reception performance of uplink signals in a communication system to which a distributed antenna structure is applied.

2. Related Art

With the development of information and communication technology, various wireless communication technologies are being developed. Representative wireless communication technologies include long term evolution (LTE) and new radio (NR) defined as the $3^{rd}$ generation partnership project (3GPP) standards. The LTE may be one of $4^{th}$ generation (4G) wireless communication technologies, and the NR may be one of $5^{th}$ generation (5G) wireless communication technologies. A wireless communication technology after 5G (e.g., $6^{th}$ generation (6G), etc.) may be referred to as a beyond-5G (B5G) wireless communication technology.

In order to improve a problem such as transmission capacity degradation in cell edge or shadow areas in a cellular communication system, a method of configuring a base station with a distributed antenna structure is being studied. The base station having a distributed antenna structure may include a plurality of distributed antennas spaced apart from each other spatially or geographically and a central control device. The base station may form beams and transmit signals through a plurality of spatially distributed antennas. Through the base station configured with a distributed antenna structure, the problem of transmission capacity degradation in cell edge or shadow areas can be resolved.

Meanwhile, since the base station configured with a distributed antenna structure transmits and receives signals through a plurality of spatially distributed antennas, there may be difficulty in determining decoding locations and decoding methods for a plurality of uplink (UL) signals received from a plurality of users. In addition, when a fronthaul capacity between the central control device of the base station and the plurality of distributed antennas is limited, the decoding performance of UL signals may deteriorate. Accordingly, techniques for improving UL signal reception performance in the base station configured with a distributed antenna structure may be required.

Matters described as the prior arts are prepared to help understanding of the background of the present disclosure, and may include matters that are not already known to those of ordinary skill in the technology domain to which exemplary embodiments of the present disclosure belong.

SUMMARY

The purpose of the present disclosure for achieving the above-described demand is to provide a method and an apparatus for transmitting and receiving signals for a base station configured with a distributed antenna structure to efficiently perform decoding operations of UL signals.

According to a first exemplary embodiment of the present disclosure, an operation method of a first access point (AP) may comprise: transmitting, to a control device of a base station, channel information between the first AP and one or more user equipments (UEs) connected to the base station; receiving allocation information determined by the control device; identifying an entity to decode a uplink (UL) signal of each of the one or more UEs from among a plurality of APs and the control device constituting the base station, based on the allocation information; directly performing a decoding operation on a first UL signal received from a first UE among the one or more UEs, based on the allocation information; and transmitting, to the control device, a first report related to a result of the decoding operation on the first UL signal.

The transmitting of the channel information may comprise: performing measurements on UL channels between the first AP and the one or more UEs; generating the channel information based on a result of the measurements on the UL channels; and transmitting the channel information to the control device.

The allocation information may include information instructing the first AP to decode a UL signal of at least the first UE among the one or more UEs.

The operation method may further comprise, when the first UL signal is successfully decoded, after transmitting the first report, receiving a first request from the control device; and transmitting a decoded first UL signal, which is a result of decoding the first UL signal, to the control device based on the first request.

The operation method may further comprise, when the first UL signal is not successfully decoded, after transmitting the first report, receiving a second request from the control device; and transmitting first information for the first UL signal to the control device based on the second request, wherein the first information is used by the control device to decode the first UL signal.

The first information may correspond to information of the first UL signal itself or information of a log-likelihood ratio (LLR) for the first UL signal.

The allocation information may include information instructing a second AP of the base station to decode a UL signal of a second UE among the one or more UEs, and the directly performing of the decoding operation on the first UL signal may comprise: receiving, from the control device, first decoding success information including information indicating that the second AP has successfully decodes a UL signal of the second UE; transmitting, to the control device, a third request requesting information on a decoding result at the second AP; receiving, from the control device, information on a decoding result of a second UL signal received by the second AP from the second UE; and decoding the first UL signal based on a successive interference cancellation (SIC) operation using the information on the decoding result of the second UL signal.

The operation method may further comprise, when the allocation information includes information instructing at least the first AP and a third AP of the base station to decode a UL signal of a third UE among the one or more UEs, after identifying the entity, receiving, from the control device, second decoding success information including information indicating that the third AP has successfully decoded a UL signal of the third UE; and determining that there is no need to perform decoding on a third UL signal received from the third UE based on the second decoding success information.

According to a second exemplary embodiment of the present disclosure, an operation method of a control device of a base station to which a distributed antenna structure is applied may comprise: receiving, from a plurality of access points (APs) included in the base station, channel information between each of the plurality of APs and one or more user equipments (UEs) connected to the base station; determining allocation information based on at least the channel information; transmitting the allocation information to at least part of the plurality of APs; and receiving, from a first AP among the plurality of APs, a first report related to a result of a decoding operation on an uplink (UL) signal received from a first UE among the one or more UEs based on the allocation information, wherein the allocation information includes information indicating an entity to decode a UL signal of each of the one or more UEs among the plurality of APs and the control device.

The determining may comprise: determining the allocation information based on at least part of the channel information, network configuration information, or monitoring information.

The network configuration information may include information on processing capacity for each AP, and the monitoring information may include information on fronthaul capacity between the control device and the APs.

The operation method may further comprise, when the first report indicates decoding success, after receiving the first report, transmitting, to the first AP, a first request requesting transmission of a decoding result of a UL signal received from the first UE; and receiving a decoded first UL signal based on the first request.

The operation method may further comprise, when the first report indicates decoding failure, after receiving the first report, transmitting, to the first AP, a second request requesting transmission of first information; and receiving, from the first AP, the first information transmitted based on the second request, wherein the first information is used by the control device to decode a UL signal from the first UE.

The operation method may further comprise, when the allocation information includes information instructing a second AP of the base station to decode a UL signal of a second UE among the one or more UEs, before receiving the first report, receiving, from the second AP, a second report indicating that the UL signal of the second UE has been successfully decoded; transmitting first decoding success information based on the second report; receiving, from the first AP, a third request requesting information on a decoding result at the second AP; and transmitting, to the first AP, information on a decoding result of a second UL signal received by the second AP from the second UE, wherein the information on the decoding result of the second UL signal is used by the first AP in a successful interference cancellation (SIC) operation for a decoding operation of a UL signal received from the first UE.

The operation method may further comprise, when the allocation information includes information instructing at least the first AP and a third AP of the base station to decode a UL signal of a third UE among the one or more UEs, after the transmitting, receiving, from the third AP, a third report indicating that a UL signal of the first UE has been successfully decoded; and based on the third report, transmitting second decoding success information to at least the first AP.

According to an exemplary embodiment of a method and an apparatus for transmitting and receiving signals in a communication system, a decoding operation for each of UL signals from UEs in a base station configured with a distributed antenna structure in the communication system can be performed a specific entity among a control device (e.g., central processing unit (CPU), etc.) and a plurality of distributed access points (APs).

According to an exemplary embodiment of a method and an apparatus for transmitting and receiving signals in a communication system, a decoding entity (decoding location) for each of UL signals can be determined through a simple signaling procedure between a control device and a plurality of distributed APs in the communication system, and the UL signals can be efficiently decoded. As a result, UL signal reception performance can be improved in the base station configured with the distributed antenna structure.

DETAILED DESCRIPTION OF THE EMBODIMENTS

Figure 1:
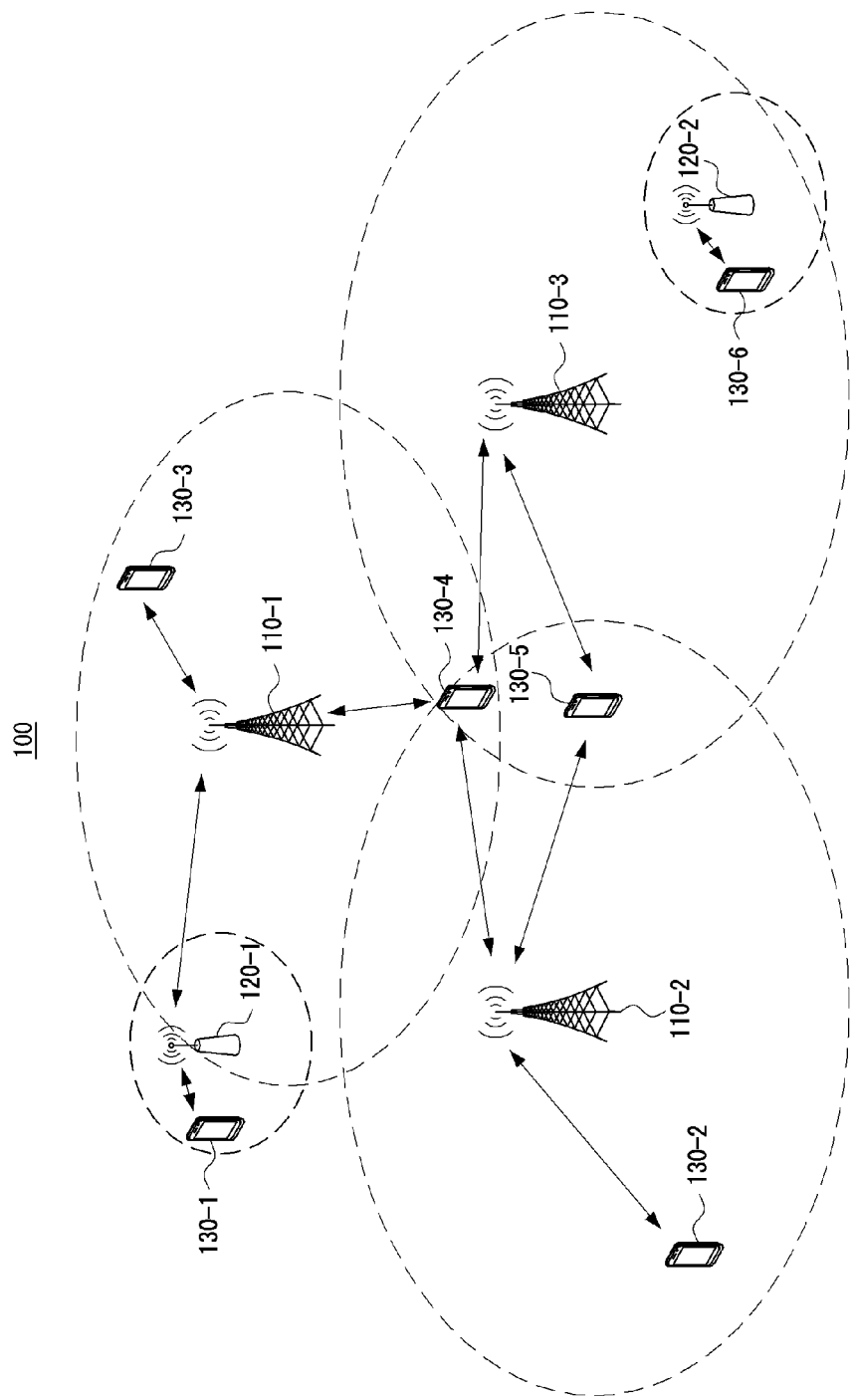
FIG. 1 is a conceptual diagram illustrating an exemplary embodiment of a communication system.

Exemplary embodiments of the present disclosure are disclosed herein. However, specific structural and functional details disclosed herein are merely representative for purposes of describing exemplary embodiments of the present disclosure. Thus, exemplary embodiments of the present disclosure may be embodied in many alternate forms and should not be construed as limited to exemplary embodiments of the present disclosure set forth herein.

Accordingly, while the present disclosure is capable of various modifications and alternative forms, specific exemplary embodiments thereof are shown by way of example in the drawings and will herein be described in detail. It should be understood, however, that there is no intent to limit the present disclosure to the particular forms disclosed, but on the contrary, the to present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular exemplary embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

A communication system to which exemplary embodiments according to the present disclosure are applied will be described. The communication system to which the exemplary embodiments according to the present disclosure are applied is not limited to the contents described below, and the exemplary embodiments according to the present disclosure may be applied to various communication systems. Here, the communication system may have the same meaning as a communication network.

Throughout the present disclosure, a network may include, for example, a wireless Internet such as wireless fidelity (WiFi), mobile Internet such as a wireless broadband Internet (WiBro) or a world interoperability for microwave access (WiMax), 2G mobile communication network such as a global system for mobile communication (GSM) or a code division multiple access (CDMA), 3G mobile communication network such as a wideband code division multiple access (WCDMA) or a CDMA2000, 3.5G mobile communication network such as a high speed downlink packet access (HSDPA) or a high speed uplink packet access (HSDPA), 4G mobile communication network such as a long term evolution (LTE) network or an LTE-Advanced network, 5G mobile communication network, B5G mobile communication network (6G mobile communication network), or the like.

Throughout the present disclosure, a terminal may refer to a mobile station, mobile terminal, subscriber station, portable subscriber station, user equipment, access terminal, or the like, and may include all or a part of functions of the terminal, mobile station, mobile terminal, subscriber station, mobile subscriber station, user equipment, access terminal, or the like.

Here, a desktop computer, laptop computer, tablet PC, wireless phone, mobile phone, smart phone, smart watch, smart glass, e-book reader, portable multimedia player (PMP), portable game console, navigation device, digital camera, digital multimedia broadcasting (DMB) player, digital audio recorder, digital audio player, digital picture recorder, digital picture player, digital video recorder, digital video player, or the like having communication capability may be used as the terminal.

Throughout the present specification, the base station may refer to an access point, radio access station, node B (NB), evolved node B (eNB), base transceiver station, mobile multihop relay (MMR)-BS, or the like, and may include all or part of functions of the base station, access point, radio access station, NB, eNB, base transceiver station, MMR-BS, or the like.

Hereinafter, preferred exemplary embodiments of the present disclosure will be described in more detail with reference to the accompanying drawings. In describing the present disclosure, in order to facilitate an overall understanding, the same reference numerals are used for the same elements in the drawings, and duplicate descriptions for the same elements are omitted.

FIG. 1 is a conceptual diagram illustrating an exemplary embodiment of a communication system.

Referring to FIG. 1, a communication system 100 may comprise a plurality of communication nodes 110-1, 110-2, 110-3, 120-1, 120-2, 130-1, 130-2, 130-3, 130-4, 130-5, and 130-6. The plurality of communication nodes may support 4th generation (4G) communication (e.g., long term evolution (LTE), LTE-advanced (LTE-A)), 5th generation (5G) communication (e.g., new radio (NR)), or the like. The 4G communication may be performed in a frequency band of 6 gigahertz (GHz) or below, and the 5G communication may be performed in a frequency band of 6 GHz or above.

For example, for the 4G and 5G communications, the plurality of communication nodes may support a code division multiple access (CDMA) based communication protocol, a wideband CDMA (WCDMA) based communication protocol, a time division multiple access (TDMA) based communication protocol, a frequency division multiple access (FDMA) based communication protocol, an orthogonal frequency division multiplexing (OFDM) based communication protocol, a filtered OFDM based communication protocol, a cyclic prefix OFDM (CP-OFDM) based communication protocol, a discrete Fourier transform spread OFDM (DFT-s-OFDM) based communication protocol, an orthogonal frequency division multiple access (OFDMA) based communication protocol, a single carrier FDMA (SC-FDMA) based communication protocol, a non-orthogonal multiple access (NOMA) based communication protocol, a generalized frequency division multiplexing (GFDM) based communication protocol, a filter bank multi-carrier (FBMC) based communication protocol, a universal filtered multi-carrier (UFMC) based communication protocol, a space division multiple access (SDMA) based communication protocol, or the like.

In addition, the communication system 100 may further include a core network. When the communication system 100 supports the 4G communication, the core network may comprise a serving gateway (S-GW), a packet data network (PDN) gateway (P-GW), a mobility management entity (MME), and the like. When the communication system 100 supports the 5G communication, the core network may comprise a user plane function (UPF), a session management function (SMF), an access and mobility management function (AMF), and the like.

Meanwhile, each of the plurality of communication nodes 110-1, 110-2, 110-3, 120-1, 120-2, 130-1, 130-2, 130-3, 130-4, 130-5, and 130-6 constituting the communication system 100 may have the following structure.

Figure 2:
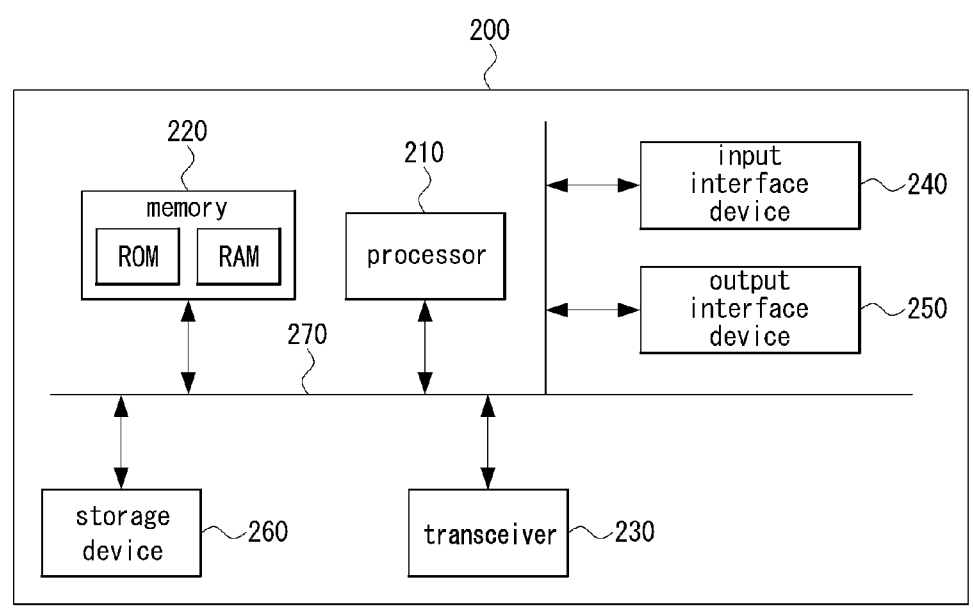
FIG. 2 is a block diagram illustrating an exemplary embodiment of a communication node constituting a communication system.

FIG. 2 is a block diagram illustrating an exemplary embodiment of a communication node constituting a communication system.

Referring to FIG. 2, a communication node 200 may comprise at least one processor 210, a memory 220, and a transceiver 230 connected to the network for performing communications. Also, the communication node 200 may further comprise an input interface device 240, an output interface device 250, a storage device 260, and the like. Each component included in the communication node 200 may communicate with each other as connected through a bus 270.

However, each component included in the communication node 200 may be connected to the processor 210 via an individual interface or a separate bus, rather than the common bus 270. For example, the processor 210 may be connected to at least one of the memory 220, the transceiver 230, the input interface device 240, the output interface device 250, and the storage device 260 via a dedicated interface.

The processor 210 may execute a program stored in at least one of the memory 220 and the storage device 260. The processor 210 may refer to a central processing unit (CPU), a graphics processing unit (GPU), or a dedicated processor on which methods in accordance with embodiments of the present disclosure are performed. Each of the memory 220 and the storage device 260 may be constituted by at least one of a volatile storage medium and a non-volatile storage medium. For example, the memory 220 may comprise at least one of read-only memory (ROM) and random access memory (RAM).

Referring again to FIG. 1, the communication system 100 may comprise a plurality of base stations 110-1, 110-2, 110-3, 120-1, and 120-2, and a plurality of terminals 130-1, 130-2, 130-3, 130-4, 130-5, and 130-6. The communication system 100 including the base stations 110-1, 110-2, 110-3, 120-1, and 120-2 and the terminals 130-1, 130-2, 130-3, 130-4, 130-5, and 130-6 may be referred to as an 'access network'. Each of the first base station 110-1, the second base station 110-2, and the third base station 110-3 may form a macro cell, and each of the fourth base station 120-1 and the fifth base station 120-2 may form a small cell. The fourth base station 120-1, the third terminal 130-3, and the fourth terminal 130-4 may belong to cell coverage of the first base station 110-1. Also, the second terminal 130-2, the fourth terminal 130-4, and the fifth terminal 130-5 may belong to cell coverage of the second base station 110-2. Also, the fifth base station 120-2, the fourth terminal 130-4, the fifth terminal 130-5, and the sixth terminal 130-6 may belong to cell coverage of the third base station 110-3. Also, the first terminal 130-1 may belong to cell coverage of the fourth base station 120-1, and the sixth terminal 130-6 may belong to cell coverage of the fifth base station 120-2.

Here, each of the plurality of base stations 110-1, 110-2, 110-3, 120-1, and 120-2 may refer to a Node-B, a evolved Node-B (eNB), a base transceiver station (BTS), a radio base station, a radio transceiver, an access point, an access node, a road side unit (RSU), a radio remote head (RRH), a transmission point (TP), a transmission and reception point (TRP), an eNB, a gNB, or the like.

Here, each of the plurality of terminals 130-1, 130-2, 130-3, 130-4, 130-5, and 130-6 may refer to a user equipment (UE), a terminal, an access terminal, a mobile terminal, a station, a subscriber station, a mobile station, a portable subscriber station, a node, a device, an Internet of things (IoT) device, a mounted apparatus (e.g., a mounted module/device/terminal or an on-board device/terminal, etc.), or the like.

Meanwhile, each of the plurality of base stations 110-1, 110-2, 110-3, 120-1, and 120-2 may operate in the same frequency band or in different frequency bands. The plurality of base stations 110-1, 110-2, 110-3, 120-1, and 120-2 may be connected to each other via an ideal backhaul or a non-ideal backhaul, and exchange information with each other via the ideal or non-ideal backhaul. Also, each of the plurality of base stations 110-1, 110-2, 110-3, 120-1, and 120-2 may be connected to the core network through the ideal or non-ideal backhaul. Each of the plurality of base stations 110-1, 110-2, 110-3, 120-1, and 120-2 may transmit a signal received from the core network to the corresponding terminal 130-1, 130-2, 130-3, 130-4, 130-5, or 130-6, and transmit a signal received from the corresponding terminal 130-1, 130-2, 130-3, 130-4, 130-5, or 130-6 to the core network.

In addition, each of the plurality of base stations 110-1, 110-2, 110-3, 120-1, and 120-2 may support multi-input multi-output (MIMO) transmission (e.g., a single-user MIMO (SU-MIMO), multi-user MIMO (MU-MIMO), massive MIMO, or the like), coordinated multipoint (CoMP) transmission, carrier aggregation (CA) transmission, transmission in an unlicensed band, device-to-device (D2D) communications (or, proximity services (ProSe)), or the like. Here, each of the plurality of terminals 130-1, 130-2, 130-3, 130-4, 130-5, and 130-6 may perform operations corresponding to the operations of the plurality of base stations 110-1, 110-2, 110-3, 120-1, and 120-2, and operations supported by the plurality of base stations 110-1, 110-2, 110-3, 120-1, and 120-2. For example, the second base station 110-2 may transmit a signal to the fourth terminal 130-4 in the SU-MIMO manner, and the fourth terminal 130-4 may receive the signal from the second base station 110-2 in the SU-MIMO manner. Alternatively, the second base station 110-2 may transmit a signal to the fourth terminal 130-4 and fifth terminal 130-5 in the MU-MIMO manner, and the fourth terminal 130-4 and fifth terminal 130-5 may receive the signal from the second base station 110-2 in the MU-MIMO manner.

The first base station 110-1, the second base station 110-2, and the third base station 110-3 may transmit a signal to the fourth terminal 130-4 in the CoMP transmission manner, and the fourth terminal 130-4 may receive the signal from the first base station 110-1, the second base station 110-2, and the third base station 110-3 in the CoMP manner. Also, each of the plurality of base stations 110-1, 110-2, 110-3, 120-1, and 120-2 may exchange signals with the corresponding terminals 130-1, 130-2, 130-3, 130-4, 130-5, or 130-6 which belongs to its cell coverage in the CA manner. Each of the base stations 110-1, 110-2, and 110-3 may control D2D communications between the fourth terminal 130-4 and the fifth terminal 130-5, and thus the fourth terminal 130-4 and the fifth terminal 130-5 may perform the D2D communications under control of the second base station 110-2 and the third base station 110-3.

Hereinafter, methods for transmitting and receiving signals in a communication system will be described. Even when a method (e.g., transmission or reception of signals) performed at a first communication node among communication nodes is described, the corresponding second communication node may perform a method (e.g., reception or transmission of the signals) corresponding to the method performed at the first communication node. That is, when an operation of a receiving node is described, a corresponding transmitting node may perform an operation corresponding to the operation of the receiving node. Conversely, when an operation of a transmitting node is described, a corresponding receiving node may perform an operation corresponding to the operation of the transmitting node.

Figure 3:
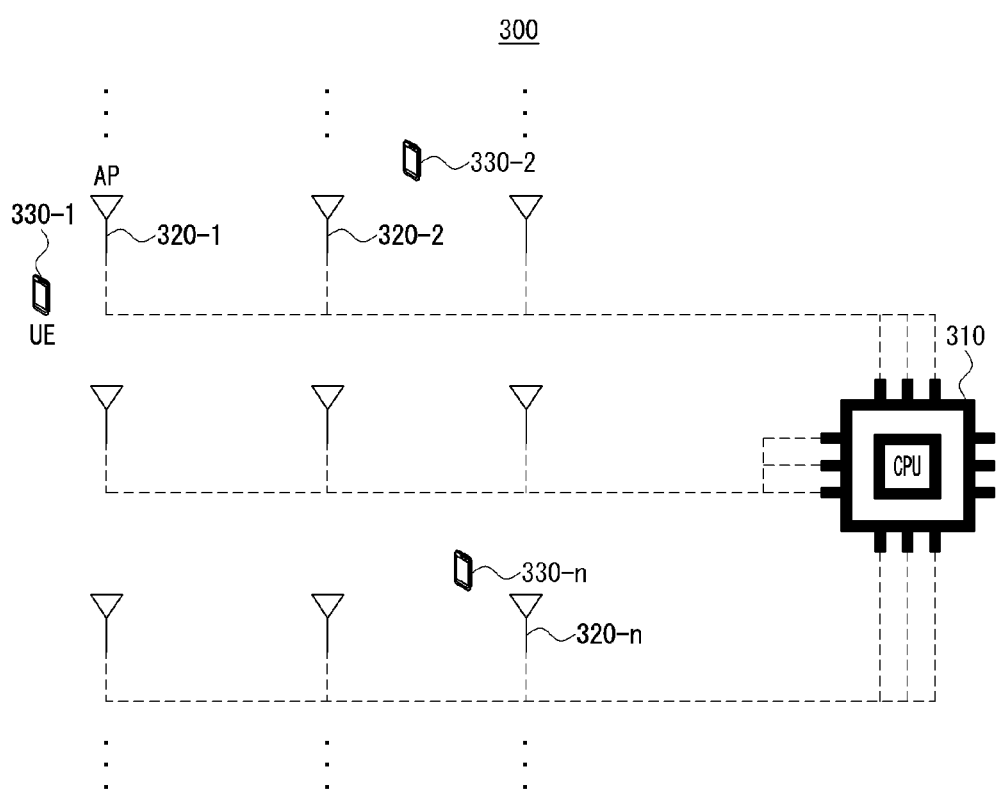
FIG. 3 is a conceptual diagram for describing an exemplary embodiment of a communication system to which a distributed antenna structure is applied.

FIG. 3 is a conceptual diagram for describing an exemplary embodiment of a communication system to which a distributed antenna structure is applied.

Referring to FIG. 3, a communication system 300 may correspond to a distributed antenna system (DAS) to which a distributed antenna structure is applied. A base station of the distributed antenna system may include a plurality of distributed antennas spatially or geographically spaced apart from each other. The base station may transmit/receive signals or beams through the plurality of distributed antennas that are spatially spaced apart from each other. The distributed antenna system may refer to a communication system in contrast to a central antenna system (CAS) in which a base station and transmit/receive antennas of the base station are located at the center of each cell. In the distributed antenna system, antennas of the base station are evenly distributed and arranged in a service coverage of a cell, so that the base station can provide improved mobile communication services than those of the centralized antenna system.

The communication system 300 may include one or more control devices 310 and one or more antennas 320-1, 320-2, . . . , and 320-n. Here, the number n of antennas may be a natural number greater than or equal to 1. The communication system 300 may correspond to or include a base station. FIG. 3 shows an exemplary embodiment in which one base station exists in the communication system 300 and the base station includes one control device 310 and the plurality of antennas 320-1, 320-2, . . . , and 320-n. However, this is only one example for convenience of description, and exemplary embodiments of the communication system are not limited thereto. For example, exemplary embodiments of the communication system to which the distributed antenna structure is applied may include various exemplary embodiments such as an exemplary embodiment in which a plurality of base stations exist, an exemplary embodiment in which a base station includes a plurality of control devices, or an exemplary embodiment in which a base station includes one antenna.

The base station of the communication system 300 may include one or more antennas 320-1, 320-2, . . . , and 320-n located in one or more access points (APs) spaced at a distance greater than or equal to a predetermined interval. The base station of the communication system 300 may perform communications with one or more communication nodes (e.g., terminals) 330-1, 330-2, . . . , and 330-n located within a cell through the one or more antennas 320-1, 320-2, . . . , and 320-n. For example, each of the one or more antennas 320-1, 320-2, . . . , and 320-n may perform signal transmission and reception by being connected to one or more terminals 330-1, 330-2, . . . , and 330-n located within a predetermined communication coverage.

The control device 310 may be connected to the one or more antennas 320-1, 320-2, . . . , and 320-n by wire or wirelessly. The control device 310 may control signal transmission/reception operations in the one or more antennas 320-1, 320-2, . . . , and 320-n. The control device 310 may transmit and receive control signals to and from the one or more antennas 320-1, 320-2, . . . , and 320-n to control the signal transmission/reception operations in the one or more antennas 320-1, 320-2, . . . , and 320-n. The control device 310 may deliver, to the one or more antennas 320-1, 320-2, . . . , and 320-n, transmission signals to be transmitted to the one or more terminals 330-1, 330-2, . . . , and 330-n. The control device 310 may receive, from the one or more antennas 320-1, 320-2, . . . , and 320-n, reception signals received by the one or more antennas 320-1, 320-2, . . . , and 320-n from the one or more terminals 330-1, 330-2, . . . , and 330-n.

The control device 310 may correspond to a central processing unit (CPU) that controls overall operations of the base station. Alternatively, the control device 310 may correspond to a higher level device including the CPU. The control device 310 and the one or more antennas 320-1, 320-2, . . . , and 320-n may function as one node. Alternatively, the control device 310 and the one or more antennas 320-1, 320-2, . . . , and 320-n may function as a plurality of mutually distinct nodes.

For example, in an exemplary embodiment of the communication system, the communication system 300 may be configured according to a functional split scheme. Here, the control device 310 may correspond to a central unit (CU) that performs upper layer functions of the base station. On the other hand, the one or more antennas 320-1, 320-2, . . . , and 320-n may correspond to antennas included in distributed units (DUs) each of which performs lower layer functions of the base station. Meanwhile, in another exemplary embodiment of the communication system, the communication system 300 may be configured according to a cooperative MIMO (COMIMO) scheme for supporting cooperative transmission (or cooperative transmission and reception) between multiple cells. Alternatively, the communication system 300 may be configured according to a cell-free massive multi-input multi-output (CF-MIMO) scheme. Here, the control device 310 may correspond to a centralized processor (CP) for controlling cooperative transmission and reception between multiple cells. Meanwhile, the one or more antennas 320-1, 320-2, . . . , and 320-n may correspond to antennas included in access nodes (ANs) performing cooperative transmission and reception under the control of the CP. However, this is only one example for convenience of description, and exemplary embodiments of the communication system are not limited thereto, and may be applied to various types of communication systems in the same or similar manner.

Figure 4:
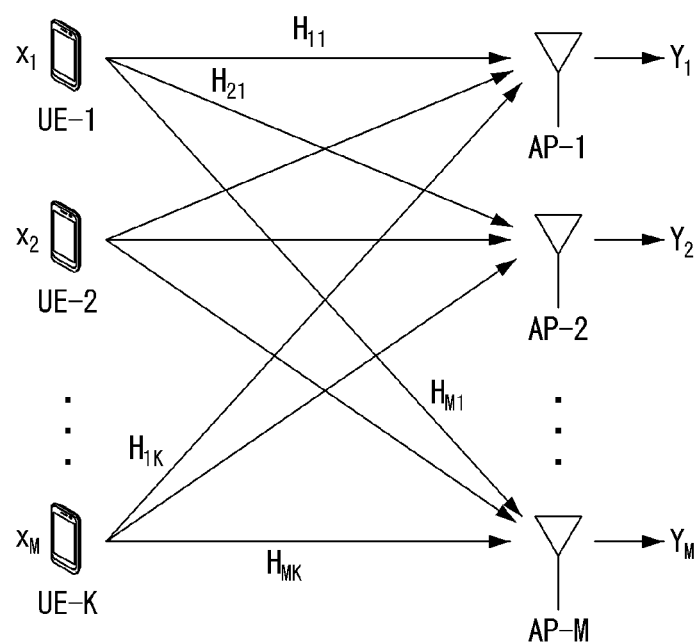
FIG. 4 is a conceptual diagram for describing an exemplary embodiment of an uplink transmission/reception operation in a communication system to which a distributed antenna structure is applied.

FIG. 4 is a conceptual diagram for describing an exemplary embodiment of an uplink transmission/reception operation in a communication system to which a distributed antenna structure is applied.

Referring to FIG. 4, a communication system 400 may include one or more UEs UE-1, UE-2, . . . , and UE-K and one or more APs AP-1, AP-2, . . . , and AP-M. The one or more APs may constitute a base station to which a distributed antenna structure is applied. The number K of the one or more UEs and the number M of the one or more APs may be a natural number greater than or equal to 1, respectively. K and M may be the same as or different from each other. The communication system 400 may be the same as or similar to the communication system described with reference to FIG. 1. Each of the one or more UEs and one or more APs may be the same as or similar to some of the communication nodes described with reference to FIG. 1. Each of the one or more UEs and one or more APs may be the same as or similar to the communication node 200 described with reference to FIG. 2.

One or more radio channels $H_{11}$, $H_{1K}$, $H_{21}$, ..., and $H_{MK}$ may be formed between the one or more UEs and the one or more APs. The one or more UEs may transmit one or more transmission signals $X_1$, $X_2$, ..., and $X_K$ through the one or more radio channels. The one or more APs may obtain one or more reception signals $Y_1$, $Y_2$, ..., and $Y_M$ based on radio signals received through the one or more radio channels.

When the number of UEs and/or APs existing in the communication system 400 is plural (i.e., when K and/or M is greater than 1), the plural UEs and/or APs may act as mutual interference sources. For example, when the UE-1 wants to transmit a radio signal to the AP-1 through the channel $H_{11}$, radio signals transmitted by the UE-2 to UE-K through the radio channels $H_{12}$ to $H_{1K}$ may act as interference. In other words, interference may occur due to the communication between the plurality of communication nodes. Such the interference phenomenon may cause a problem such as a decrease in a transmission rate between the communication nodes in the communication system, signals transmitted by a transmitting node not being properly received by a receiving node, or signals not transmitted by a transmitting node appearing to be received by a receiving node.

For example, when a plurality of UEs simultaneously transmit transmission signals $X_1$, $X_2$, ..., and $X_K$ in the distributed antenna environment, a reception signal $Y_m$ received by the m-th AP among the M APs may be expressed equally or similarly to Equation 1.

$$Y_m = \sum_{k=1}^{K} H_{mk} X_k + N_m \quad \text{[Equation 1]}$$

In Equation 1, $H_{mk}$ may mean a channel between the k-th UE (i.e., UE-k) and the m-th AP (i.e., AP-m). $X_k$ may mean a UL signal transmitted by the UE-k. $N_m$ may mean a noise component generated in the AP-m. When the AP-m wants to decode a UL signal received from the j-th UE (i.e., UE-j), Equation 1 may be expressed as Equation 2 by separating a component $H_{mj}X_j$ for the UL signal of the j-th UE.

$$Y_m = H_{mj}X_j + \sum_{k=1, k \neq j}^{K} H_{mk} X_k + N_j \quad \text{[Equation 2]}$$

In Equation 2, a sum of UL data from the remaining UEs excluding the UE-j (i.e., $\Sigma_{k=1,k\neq j}^{K} H_{mk} X_k$) may be considered as an interference component. The interference component may cause performance degradation in a decoding operation of reception signals. In the environment shown in FIG. 4, the APs may decode UL signals transmitted from the UEs by applying appropriate reception and decoding techniques. For example, a maximum likelihood (ML) technique, a minimum mean square error (MMSE) technique, a zero focusing (ZF) technique, and/or the like may be applied.

Channel information (e.g., UL channel information) may be used for the UL reception signal decoding operation in the APs. The UL channel information between the UEs and the APs may be measured by the APs based on UL pilot signals, sounding reference signals (SRSs), and the like. At least part of the channel information of each channel (e.g., information on a long-term channel gain value) may be identified by each of the APs and the CPU together. The CPU may determine and/or allocate a UE to be supported by each AP based on information on the channel gain values between the respective APs and the respective UEs.

Figure 5:
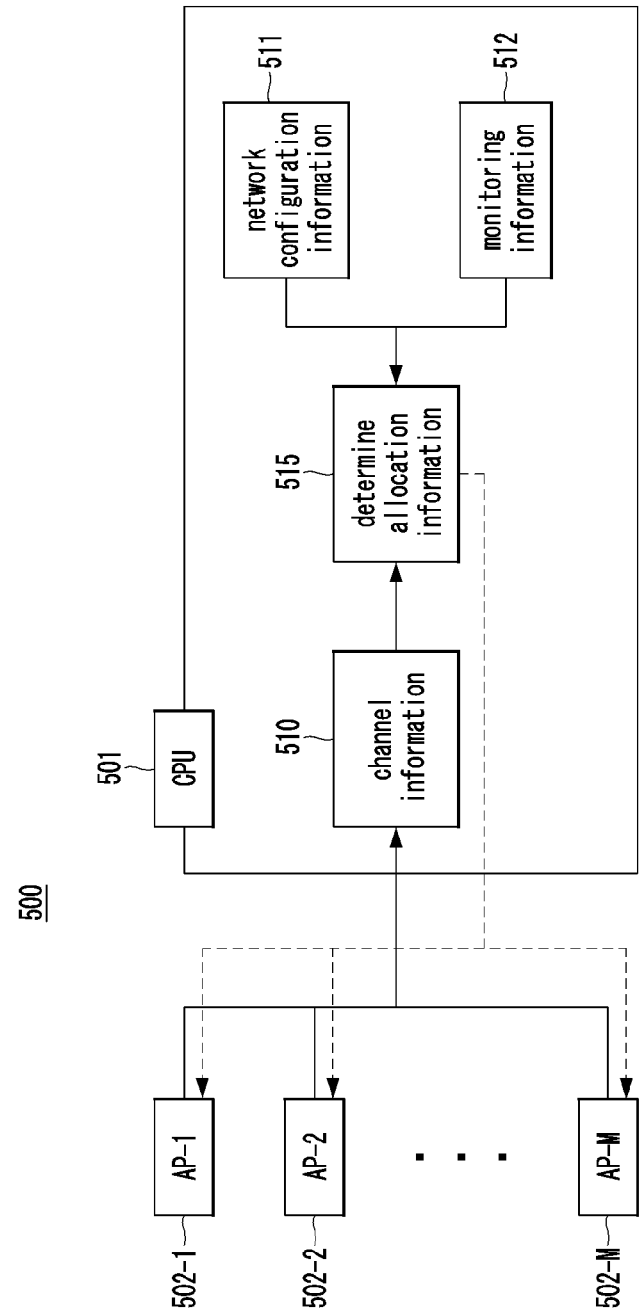
FIG. 5 is a conceptual diagram for describing an exemplary embodiment of a base station to which a distributed antenna structure is applied in a communication system.

FIG. 5 is a conceptual diagram for describing an exemplary embodiment of a base station to which a distributed antenna structure is applied in a communication system.

Referring to FIG. 5, a base station 500 to which a distributed antenna structure is applied may include a control device 501 and one or more antennas. The base station 500 may be the same as or similar to the base station described with reference to FIG. 3. The control device 501 and the one or more antennas may be the same as or similar to the control device 310 and the one or more antennas 320-1, 320-2, ..., and 320-n described with reference to FIG. 3. For example, the communication system may include the base station 500 to which a distributed antenna structure is applied. The base station may include the one or more antennas located in one or more APs 502-1, 502-2, ..., and 502-M spaced apart from each other by a predetermined distance or more in space. The control device 501 may correspond to a CPU that controls and processes signal transmission/reception operations in the one or more APs 502-1, 502-2, ..., and 502-M. The CPU 501 may transmit and receive control signals with the one or more APs 502-1, 502-2, ..., and 502-M to control the signal transmission/reception operations in the one or more APs 502-1, 502-2, ..., and 502-M.

Each of the one or more APs 502-1, 502-2, ..., and 502-M may be connected to other communication nodes through antenna(s). The APs 502-1, 502-2, ..., and 502-M may perform channel measurements on channels formed between the connected communication nodes. The APs 502-1, 502-2, ..., and 502-M may each obtain channel information based on a result of the channel measurement. Here, the channel information may include DL channel information, UL channel information, and the like. The APs 502-1, 502-2, ..., and 502-M may transmit the obtained channel information to the control device 501.

The control device 501 may obtain channel information 510 from the APs 502-1, 502-2, ..., and 502-M. The control device 501 may determine or allocate an entity (hereinafter referred to as 'UL signal decoding entity') for decoding each of one or more UL signals received from one or more UEs based on the channel information 510 obtained from the APs 502-1, 502-2, ..., and 502-M. The control device 501 may further refer to network configuration information 511 and monitoring information 512 together with the channel information 510 in order to determine the UL signal decoding entity. The channel information 510 may include UL channel information between the APs 502-1, 502-2, ..., and 502-M and one or more UEs. For example, the UL channel information may include channel quality information (CQI), channel state information (CSI), CSI-interference measurement (CSI-IM), signal-to-interference-plus-noise ratio (SINR), and/or the like. The network configuration information 511 may include information related to configuration of the APs 502-1, 502-2, ..., and 502-M. The network configuration information 511 may include, for example, information on processing capacity of each AP, information on decoding capability of each AP, and the like. The network configuration information 511 may include information on the number of antennas for each AP, information on the number of analog-to-digital converter (ADC) bits for each AP, and the like. The monitoring information 512 may include, for example, information on a fronthaul capacity, information on a traffic load, and the like. The network configuration information 511 and monitoring information 512 may be included in network context information. In addition to the network configuration information 511 and monitoring information 512, the network context information may further include important information for management of the network, base station(s), AP(s), and the like.

The control device 501 may determine information on a result of allocating the UL signal decoding entity for each UE (hereinafter referred to as 'allocation information' 515) based on at least part of the channel information 510 and the network context information. The allocation information 515 may be regarded as indicating that each of the UEs is allocated to a specific decoding entity. If the network context information does not exist, the control device 501 may determine the allocation information 515 based on the channel information 510.

The control device 501 may transmit the determined allocation information 515 to at least part of the APs 502-1, 502-2, ..., and 502-M. The control device 501 may transmit the allocation information 515 to all of the APs 502-1, 502-2, ..., and 502-M. Alternatively, the control device 501 may transmit the allocation information 515 only to AP(s) determined as UL signal decoding entity(ies) among the APs 502-1, 502-2, ..., and 502-M. Alternatively, if the UL signal decoding entity is determined as the control device 501 itself, the control device 501 may not transmit the allocation information 515.

Specifically, the control device 501 may manage the channel information 510 obtained from the APs 502-1, 502-2, ..., and 502-M in the same or similar form as Table 1.

TABLE 1

| AP index | UE index | UL channel information |
|---|---|---|
| AP-1 | UE-2 | CQI = 4, SINR = 3 |
|  | UE-1 | CQI = 2, SINR = 1 |
| AP-2 | UE-3 | CQI = 7, SINR = 3 |
|  | UE-2 | CQI = 5, SINR = 4 |
|  | UE-1 | CQI = 2, SINR = 1 |
| ... | ... | ... |

Meanwhile, the control device 501 may determine the allocation information 515 in the same or similar form as Table 2.

TABLE 2

| UE index | Decoding entity (location) | Option |
|---|---|---|
| UE-3 | AP-2 | Decoded data |
| UE-2 | AP-1 | Decoded data |
| UE-1 | CPU | LLR or received UL signal |

Referring to Table 2, the control device 501 may determine whether each of the APs 502-1, 502-2, ..., and 502-M can restore a UL signal of a specific UE on the basis of the channel information 510 and the like. In addition, the control device may determine the most efficient UL signal decoding entities (in other words, UL signal decoding locations) on the basis of the network configuration information 511 and the monitoring information 512. If it is determined that processing capability, fronthaul burden, etc. are similar for the respective APs 502-1, 502-2, ..., and 502-M, the control device 501 may determine UL signal decoding locations so that the decoding burdens therefor are equally allocated as shown in Table 2.

For example, the control device 501 may determine the UL signal decoding entities (APs and/or control device) capable of decoding the UL signals from the UE-1, UE-2, and UE-2 based on at least part of the channel information 510, network configuration information 511, or to monitoring information 512 configured in the same or similar form as in Table 1.

Here, the control device 501 may determine that the AP-2 and the AP-1 can successfully decode UL signals from the UE-3 and UE-2. Here, if it is determined that the AP-2 and the AP-1 have similar processing capabilities, fronthaul burdens, etc. (or do not differ by more than a certain extent), the control device 501 may determine that the AP-2 and the AP-1 perform decoding for the UE-3 and the UE-2, respectively, identically or similarly as shown in Table 2. In other words, the control device 501 may determine allocation information 515 including information instructing the AP-2 to decode a UL signal from the UE-1 and/or information instructing the AP-3 to decode a UL signal from the UE-2. The allocation information 515 may further include information instructing the AP-2 and the AP-1 to transmit decoded signals (or decoded data) to the control device 510 after the AP-2 and AP-1 decode the UL signals from the UE-3 and UE-2.

On the other hand, the control device 501 may determine that a UL signal from the UE-1 is not easy for APs to decode. In this case, the control device 501 may determine that the control device 501 itself performs decoding of a UL signal from the UE-1. In this case, the allocation information 515 may further include information indicating that the control device 501 is to decode a UL signal from the UE-1. The allocation information 515 may further indicate a type of information to be transmitted by the APs to the control device 501 so that the control device 501 can decode a UL signal from the UE-1. For example, the allocation information 515 may instruct the APs to transmit LLR data (or LLR information) for a UL signal received from the UE-1 to the control device 501. Alternatively, the allocation information 515 may instruct the APs to transmit a UL signal itself received from the UE-1 to the control device 501. The information transmitted by the APs to the control device 501 so that the control device 501 can decode the UL signal from the UE-1 may be referred to as 'partial UL data'.

Meanwhile, when it is determined that some of the APs 502-1, 502-2, ..., and 502-M have insufficient processing capacity or excessive fronthaul burdens, the control device 510 may determine that the corresponding AP(s) do not perform decoding on UL signals. For example, when it is determined that there is a problem (e.g., link instability or lack of fronthaul capacity, etc.) in the fronthaul between the AP-1 502-1 and the control device 501, the allocation information 515 determined by the control device 501 may be changed from the form shown in Table 2 to a form shown in Table 3.

TABLE 3

| UE index | Decoding entity (location) | Option |
|---|---|---|
| UE-3 | AP-2 | Decoded data |
| UE-2 | AP-2 | Decoded data |
| UE-1 | CPU | LLR or received UL signal |

Referring to Table 3, even when the AP-1 successfully decodes a UL signal from the UE-2, it may not be easy for the control device 501 to receive decoded data from the AP-1 if there is a problem related to a fronthaul. In this case, the control device 501 may determine the allocation information 515 so that decoding of a UL signal from the UE-2 is performed by the AP-2 rather than by the AP-1.

Meanwhile, in an exemplary embodiment of the communication system 500, the allocation information 515 may instruct a plurality of entities to perform decoding of a UL signal of a specific UE. For example, the control device 501 may determine the allocation information 515 in the same or similar form as Table 4.

TABLE 4

| UE index | Decoding entity (location) | Option |
|---|---|---|
| UE-3 | AP-2 | Decoded data |
| UE-2 | AP-1, AP-2 | Decoded data |
| UE-1 | CPU | LLR or received UL signal |

Referring to Table 4, the allocation information 515 may instruct the AP-1 and the AP-2 to perform or attempt decoding of a UL signal of the UE-2.

Figure 6:
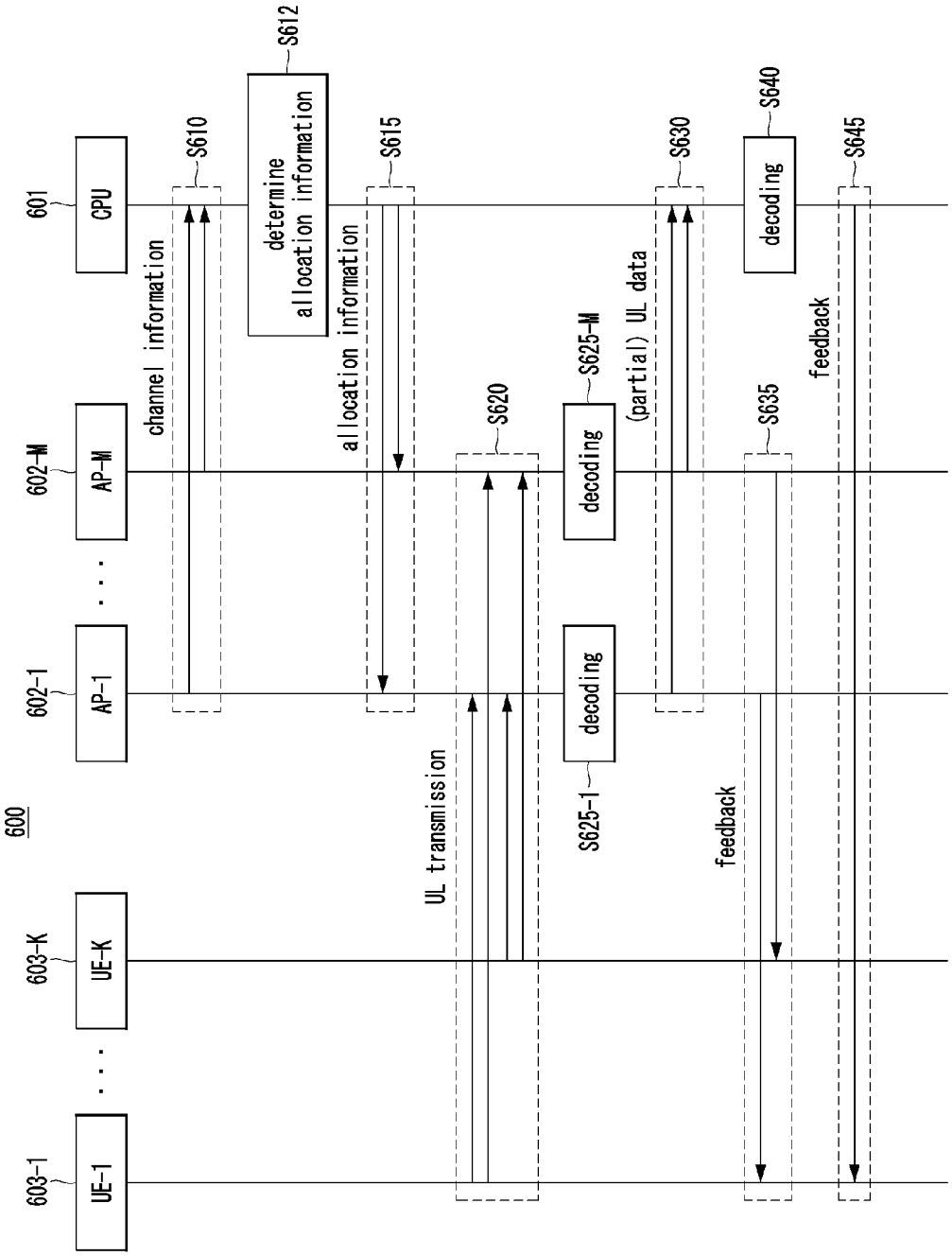
FIG. 6 is a flowchart illustrating a first exemplary embodiment of an uplink signal reception method in a communication system.

FIG. 6 is a flowchart illustrating a first exemplary embodiment of an uplink signal reception method in a communication system.

Referring to FIG. 6, a communication system 600 may include one or more UEs and one or more base stations. At least part of the one or more base stations may have a distributed antenna structure. A base station configured with a distributed antenna structure may include a plurality of APs that receive radio signals through a plurality of antennas and one or more control devices. Each of the one or more control devices may also be referred to as 'CPU'. In other words, the configurations described for the CPU in FIG. 6 may be equally or similarly applied to one or more control devices. FIG. 6 shows an example where the communication system 600 includes one base station to which a distributed antenna structure is applied and a plurality of UEs 603-1, . . . , and 603-K, and one base station includes one CPU 601 and a plurality of APs 602-1, . . . , and 602-M. However, this is only an example for convenience of description, and the first exemplary embodiment of the uplink signal reception method is not limited thereto. In the communication system 600, the one base station, one CPU 601, and plurality of APs 602-1, . . . , and 602-M may be the same as or similar to the base station 500, one control device 501, and plurality of APs 502-1, . . . , and 502-M described with reference to FIG. 5. Hereinafter, in describing the first exemplary embodiment of the uplink signal reception method with reference to FIG. 6, the same or similar contents as described with reference to FIGS. 1 to 5 may be omitted.

In an exemplary embodiment of the communication system 600, the APs 602-1, . . . , and 602-M may transmit channel information to the CPU 601 (S610). The channel information transmitted in step S610 may be the same as or similar to the channel information 510 described with reference to FIG. 5. The CPU 601 may receive the channel information from the APs 602-1, . . . , and 602-M (S610).

The CPU 601 may determine allocation information based on at least the channel information received in step S610 (S612). The allocation information determined by the CPU 601 in step S612 may be the same as or similar to the allocation information 515 described with reference to FIG. 5. An operation of determining the allocation information by the CPU 601 in step S612 may be the same as or similar to the operation of determining the allocation information 515 by the control device 501 described with reference to FIG. 5. The CPU 601 may determine the allocation information based on at least part of the channel information or network context information received in step S610. The allocation information determined in step S612 may indicate entities (e.g., APs and/or CPU) for decoding a UL signal from each of the UEs 603-1, . . . , and 603-K of the communication system 600. The allocation information determined in step S612 may include information on a decoding method corresponding to each UE or information on a decoding method corresponding to each decoding entity. The allocation information may be configured in the same or similar form as those shown in Tables 2 and 3 described with reference to FIG. 5.

The CPU 601 may transmit the determined allocation information to the APs 602-1, . . . , and 602-M (S615). In step S615, the CPU 601 may transmit the allocation information to all the APs 602-1, . . . , and 602-M. Alternatively, in step S615, the CPU 601 may transmit the allocation information to some of the APs 602-1, . . . , and 602-M. For example, the CPU 601 may transmit the allocation information to at least some APs indicated by the allocation information among the APs 602-1, . . . , and 602-M.

At least some of the APs 602-1, . . . , and 602-M may receive the allocation information from the CPU 601 (S615). At least some of the APs 602-1, . . . , and 602-M may identify the received allocation information. Each of at least some of the APs 602-1, . . . , and 602-M may identify UE(s) allocated to itself based on the allocation information. In other words, each of the APs indicated by the allocation information among the APs 602-1, . . . , and 602-M may identify one or more UEs that each AP will be responsible for decoding UL signals. Alternatively, at least some of the APs 602-1, . . . , and 602-M may identify a type of information (e.g., partial UL data) to transmit to the CPU 601 so that the CPU 601 can decode a UL signal from a specific UE.

At least some of the UEs 603-1, . . . , and 603-K may transmit UL signal(s) (S620). At least some of the APs 602-1, . . . , and 602-M may receive the UL signal(s) (S620). At least some of the APs that have received the UL signal(s) may perform decoding. For example, the AP-1 602-1 may perform decoding on UL signal(s) of one or more UEs allocated to itself (S625-1). The AP-M 602-M may perform decoding on UL signal(s) of one or more UEs allocated to itself (S625-M).

At least some of the APs 602-1, . . . , and 602-M may transmit UL data or partial UL data to the CPU 601 (S630). In addition, at least some of the APs 602-1, . . . , and 602-M may transmit feedback(s) (e.g., ACK, NACK, HARQ-ACK, HARQ-NACK) to the UEs 603-1, . . . , and 603-K (S635). The CPU 601 may receive the UL data or partial UL data in step S630. If the CPU 601 receives UL data decoded based on a UL signal from a specific UE in step S630, it may be regarded that the base station has normally received the corresponding UL signal. If the CPU 601 receives partial UL data related to a UL signal from a specific UE in step S630, the CPU 601 may perform decoding based on the received partial UL data (S640). Based on a decoding result in step S640, the CPU 601 may transmit a feedback (e.g., ACK, NACK, HARQ-ACK, HARQ-NACK) to the corresponding UE (S645).

The operations described with reference to FIG. 6 are merely examples for convenience of description, and the first exemplary embodiment of the uplink signal reception method in the communication system is not limited thereto. For example, the first exemplary embodiment of the uplink signal reception method in the communication system may be flexibly changed and modified based on the number of APs, the number of UEs, fronthaul capacity condition, CPU operation policy, and the like. At least some of the operations described with reference to FIG. 6 will be described in more detail with reference to FIGS. 7 to 9 hereinafter.

Figure 7:
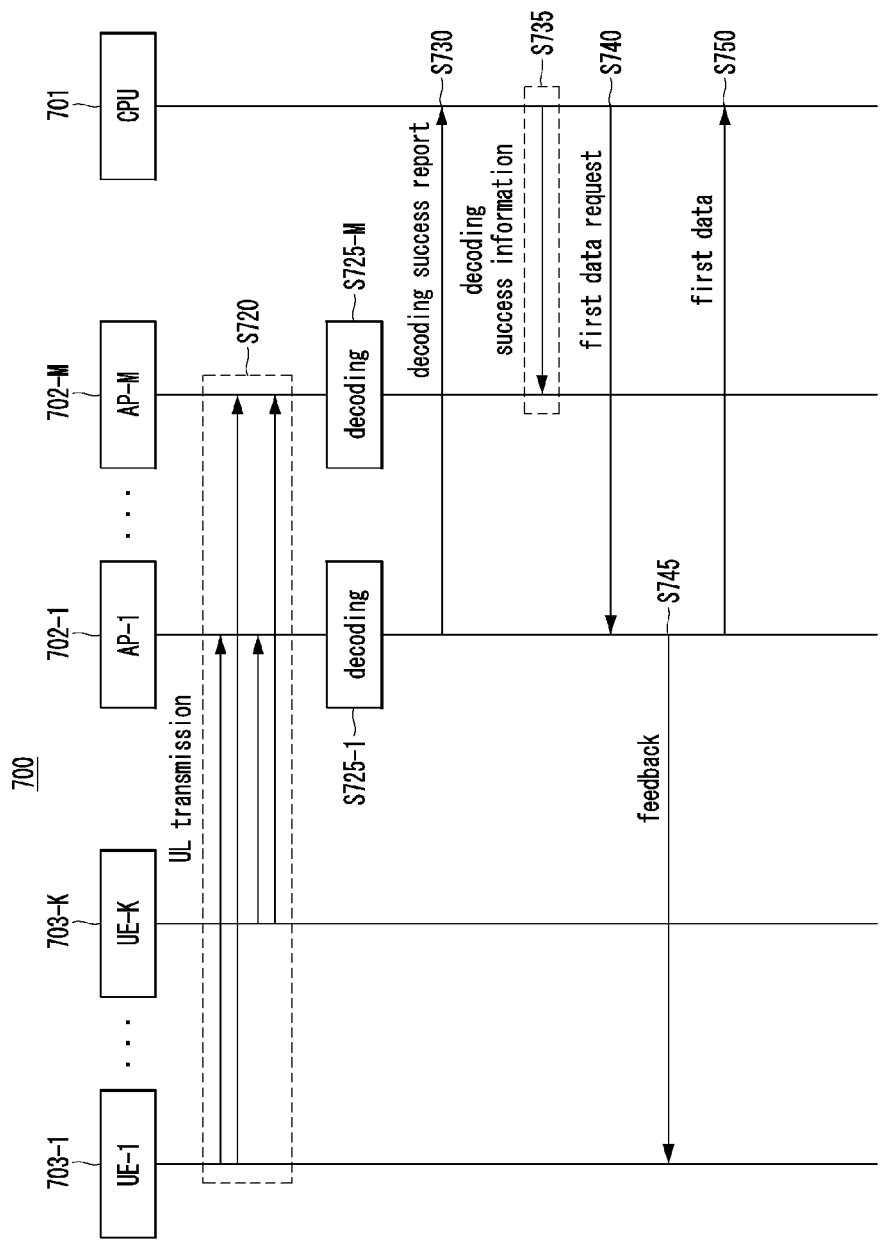
FIG. 7 is a flowchart illustrating a second exemplary embodiment of an uplink signal reception method in a communication system.

FIG. 7 is a flowchart illustrating a second exemplary embodiment of an uplink signal reception method in a communication system.

Referring to FIG. 7, a communication system 700 may be the same as or similar to the communication system 600 described with reference to FIG. 6. One base station, one CPU 701 and a plurality of APs 702-1, . . . , and 702-M included in the communication system 700 may be the same as or similar to the base station, one CPU 601, and the plurality of APs 602-1, . . . , and 602-M described with reference to FIG. 6. Hereinafter, in describing the second exemplary embodiment of the uplink signal reception method with reference to FIG. 7, the same or similar content as described with reference to FIGS. 1 to 6 may be omitted.

In an exemplary embodiment of the communication system 700, the CPU 701 and the APs 702-1, . . . , and 702-M constituting the base station may perform the same or similar operations as those of steps S610 to S615 described with reference to FIG. 6. In an exemplary embodiment of the communication system 700, UEs 703-1, . . . , and 703-K and the APs 702-1, . . . , and 702-M may perform UL signal transmission and reception procedures (S720) and decoding procedures (S725-1, S725-M). The operations according to steps S720, S725-1, and S725-M may be the same as or similar to the operations according to steps S620, S625-1, and S625-M described with reference to FIG. 6.

In an exemplary embodiment of the communication system 700, allocation information determined by the CPU 701 may indicate that the AP-1 702-1 decodes a UL signal of the UE-1 703-1. The AP-1 702-1 may decode a UL signal (hereinafter referred to as 'first UL signal') received from the UE-1 703-1 (S725-1). The AP-1 702-1 may determine whether or not the decoding operation in step S725-1 has been successfully performed. For example, when a decoding result indicates successful cyclic redundancy check (CRC), the AP-1 702-1 may determine that the decoding operation has been successfully performed.

In an exemplary embodiment of the communication system 700, the AP-1 702-1 may successfully decode UL signals received from the UE-1, UE-4, and UE-5. When the AP successfully decodes UL signal(s) from one or more specific UEs in this manner, the corresponding one or more UEs may be referred to as 'decoded UE' or 'decoded UEs'.

The AP-1 702-1 may transmit a decoding success report to the CPU 701 (S730). The decoding success report may include the same or similar information as in Table 5, for example.

TABLE 5

| AP index | AP-1 |
|---|---|
| Decoded UE index | UE-1 |
|  | UE-4 |
|  | UE-5 |

The CPU 701 may receive the decoding success report from the AP-1 702-1 (S730). The CPU 701 may configure decoding success information based on information included in the decoding success report received from the AP-1 702-1. The decoding success information may be configured identically or similarly to the decoding success report. The decoding success information may be configured to include at least part of information included in the decoding success report. The CPU 701 may transmit the configured decoding success information to at least some of the APs 702-1, . . . , and 702-M (S735).

For example, the CPU 701 may transmit the decoding success information to all the APs 702-1, . . . , and 702-M. Alternatively, the CPU 701 may transmit the decoding success information to APs other than the AP-1 702-1 that has transmitted the decoding success report corresponding to the decoding success information. By transmitting the decoding success information to the APs by the CPU 701, it may be made possible to prevent another AP from attempting to decode a UL signal that has already been successfully decoded by a specific AP. Accordingly, unnecessarily redundant decoding operations (or decoding calculations) may be prevented, and the complexity of uplink signal reception operations may be reduced.

If the CPU 701 receives decoding success reports from a plurality of APs, the CPU 701 may configure decoding success information identically or similarly to Table 6.

TABLE 6

| AP index | AP-1 | AP-2 |
|---|---|---|
| Decoded UE index | UE-1 | UE-1 |
|  | UE-4 | UE-2 |
|  | UE-5 | UE-3 |

The CPU 701 may request decoded data (hereinafter, 'first data') from at least some of the APs that have transmitted the decoding success reports. For example, the CPU 701 may request transmission of the first data from the AP-1 702-1 based on the decoding success report received in step S730 (S740). The AP-1 702-1 may receive a signal requesting transmission of the first data from the CPU 701 (S740). The AP-1 702-1 may transmit a feedback indicating that the first UL signal has been successfully decoded to the UE-1 703-1. The AP-1 702-1 may transmit the first data to the CPU 701 based on the signal received in step S740 (S750).

Figure 8:
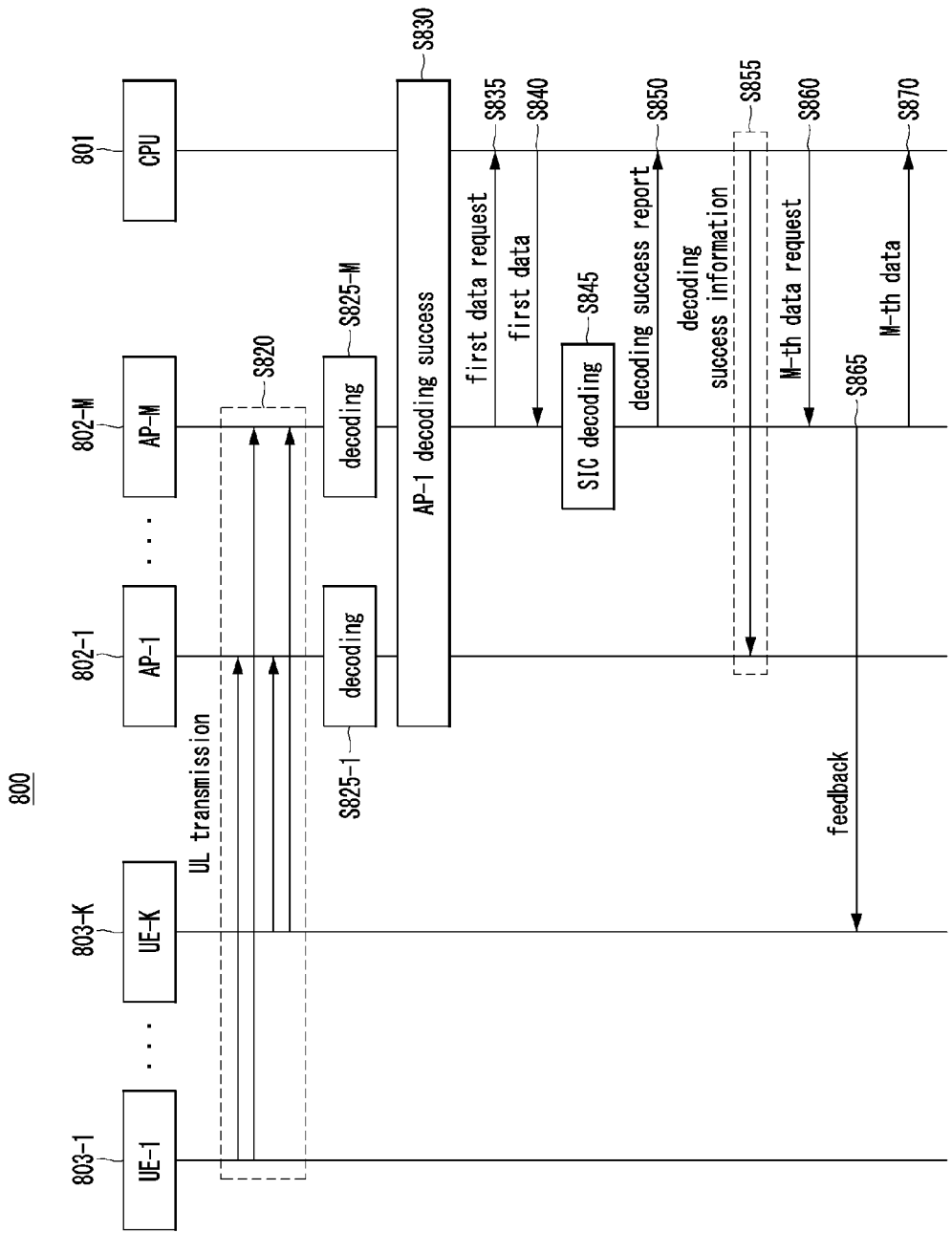
FIG. 8 is a flowchart illustrating a third exemplary embodiment of an uplink signal reception method in a communication system.

FIG. 8 is a flowchart illustrating a third exemplary embodiment of an uplink signal reception method in a communication system.

Referring to FIG. 8, a communication system 800 may be the same as or similar to the communication system 600 described with reference to FIG. 6. One base station, one CPU 801 and a plurality of APs 802-1, . . . , and 802-M included in the communication system 800 may be the same as or similar to the base station, one CPU 601, and the plurality of APs 602-1, . . . , and 602-M described with reference to FIG. 6. Hereinafter, in describing the third exemplary embodiment of the uplink signal reception method with reference to FIG. 8, the same or similar content as described with reference to FIGS. 1 to 7 may be omitted.

In an exemplary embodiment of the communication system 800, the CPU 801 and the APs 802-1, . . . , and 802-M constituting the base station may perform operations identical or similar to those of steps S610 to S615 described with reference to FIG. 6. In an exemplary embodiment of the communication system 800, UEs 803-1, . . . , and 803-K and the APs 802-1, . . . , and 802-M may perform UL signal transmission and reception procedures (S820) and decoding procedures (S825-1, S825-M). The operations according to steps S820, S825-1, and S825-M may be the same as or similar to the operations according to steps S620, S625-1, and S625-M described with reference to FIG. 6.

Meanwhile, in an exemplary embodiment of the communication system 800, the AP-M 802-M may perform a decoding operation based on cooperation with the CPU 801 instead of performing step S825-M corresponding to an independent decoding operation. For example, when the AP-M 802-M receives information indicating that a certain AP has successfully decoded a UL signal (i.e., decoding success information), the AP-M 802-M may obtain successfully decoded information through the CPU 801. The AP-M 802-M may perform decoding based on a successful interference cancellation (SIC) operation using the information decoded by another AP.

For example, if the AP-1 802-1 succeeds in decoding according to step S825-1, at least some of the CPU 801 and the APs 802-1, . . . , and 802-M may perform a signaling procedure related to the successful decoding in the AP-1 802-1 (S830). The operations according to the signaling procedure in step S830 may be the same as or similar to at least some of the operations according to steps S730 to S750 described with reference to FIG. 7.

The AP-M 802-M may receive decoding success information from the CPU 801 indicating that the AP 802-1 has successfully decoded a UL signal from the UE-1 803-1. The AP-M 802-M may transmit a signal requesting transmission of the first data received from the AP-1 802-1 to the CPU 801 (S835). The CPU 801 may transmit the first data to the AP-M 802-M based on the signal received in step S835 (S840). The AP-M 802-M may receive the first data from the CPU 801 (S840).

The AP-M 802-M may perform a decoding operation based on an SIC operation using the first data received from the CPU 801 (S845). When performing a decoding operation on a UL signal received from the UE-K 803-K, the AP-M 802-M may apply an SIC operation using the first data. Through this, probability of data loss or influence of interference during the signal transmission/reception may be effectively reduced.

When the AP-M 802-M successfully decodes the UL signal from the UE-K 803-K in step S845, the AP-M 802-M may transmit a decoding success report to the CPU 801 (S850). The CPU 801 may receive the decoding success report from the AP-M 802-M (S850). The CPU 801 may configure decoding success information based on information included in the decoding success report received from the AP-M 802-M. The CPU 801 may transmit the configured decoding success information to at least some of the APs 802-1, . . . , and 802-M (S855).

The CPU 801 may transmit, to the AP-M 802-M, a signal requesting transmission of information successfully decoded by the AP-M 802-M (hereinafter referred to as 'M-th data') (S860). The AP-M 802-M may transmit a feedback indicating that the UL signal from the UE-K 803-K has been successfully decoded to the UE-K 803-K (S865). The AP-M 802-M may transmit the M-th data to the CPU 801 based on the signal received in step S860 (S870). Technical features of the operations according to steps S850 to S870 may be the same as or similar to those of the operations according to steps S730 to S750 described with reference to FIG. 7.

Figure 9:
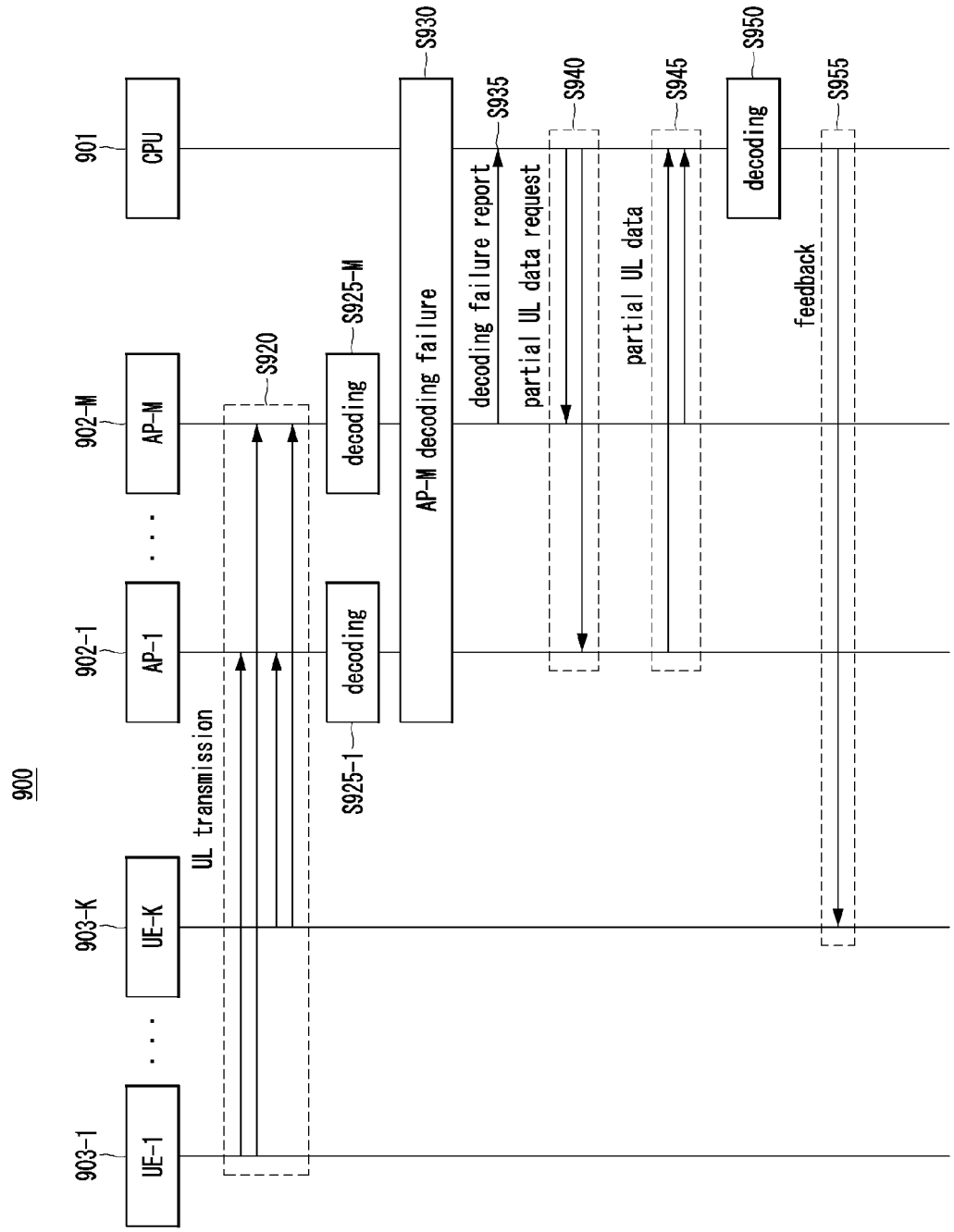
FIG. 9 is a flowchart illustrating a fourth exemplary embodiment of an uplink signal reception method in a communication system.

FIG. 9 is a flowchart illustrating a fourth exemplary embodiment of an uplink signal reception method in a communication system.

Referring to FIG. 9, a communication system 900 may be the same as or similar to the communication system 600 described with reference to FIG. 6. One base station, one CPU 901 and a plurality of APs 902-1, . . . , and 902-M included in the communication system 900 may be the same as or similar to the base station, one CPU 601, and the plurality of APs 602-1, . . . , and 602-M described with reference to FIG. 6. Hereinafter, in describing the fourth exemplary embodiment of the uplink signal reception method with reference to FIG. 9, the same or similar content as described with reference to FIGS. 1 to 8 may be omitted.

In an exemplary embodiment of the communication system 900, the CPU 901 and the APs 902-1, . . . , and 902-M constituting the base station may perform operations identical or similar to those of steps S610 to S615 described with reference to FIG. 6. In an exemplary embodiment of the communication system 900, UEs 903-1, . . . , and 903-K and the APs 902-1, . . . , and 902-M may perform UL signal transmission and reception procedures (S920) and decoding procedures (S925-1, S925-M). The operations according to steps S920, S925-1, and S925-M may be the same as or similar to the operations according to steps S620, S625-1, and S625-M described with reference to FIG. 6.

In an exemplary embodiment of the communication system 900, when a specific AP fails to decode a UL signal from a specific UE, the CPU 801 may perform decoding of the UL signal from the corresponding UE instead of the corresponding AP. For example, if the AP-M 902-M fails to decode according to step S925-1 (S930), the AP-M 902-M may transmit a decoding failure report to the CPU (901) (S930). Based on the decoding failure report received in step S930, the CPU 901 may identify that the AP-M 902-M failed to decode a UL signal (hereinafter referred to as 'K-th UL signal') from the UE-K 903-K. In order to perform decoding on the K-th UL signal, the CPU 901 may transmit a signal requesting transmission of partial UL data for the K-th UL signal to at least some of the APs 902-1, . . . , and 902-M (S940). Here, the partial UL data may be the same as or similar to the partial UL data described with reference to FIG. 6. The APs that have received the K-th UL signal in step S920 among the APs 902-1, . . . , and 902-M may transmit partial UL data for the K-th UL signal based on the request from the CPU 901 (S945). The information transmitted in step S945 may be configured identically or similarly to Table 7, for example.

TABLE 7

| Index | Partial UL data |
|---|---|
| AP-1 | LLR at AP-1 for k-th UL signal |
| AP-2 | LLR at AP-2 for k-th UL signal |
| . . . | . . . |
| AP-M | LLR at AP-M for k-th UL signal |

Alternatively, each AP may transmit to the CPU 901 partial UL data for a UL signal that the AP has not successfully decoded. For example, information of partial UL data transmitted from the AP-M 902-M to the CPU 901 may be configured identically or similarly to Table 8.

TABLE 8

| Index | Partial UL data |
| --- | --- |
| UE-1 | LLR at AP-M for UL signal from UE-1 |
| UE-2 | LLR at AP-M for UL signal from UE-2 |
| ... | ... |
| UE-K | LLR at AP-M for UL signal from UE-K |

The CPU 901 may perform decoding on the K-th UL signal based on the partial UL data for the K-th UL signal received in step S945 (S950). The CPU 901 may obtain data corresponding to the K-th UL signal based on a result of the decoding operation in step S950. Meanwhile, the CPU 901 may transmit a feedback to the UE-K 903-K based on a result of the decoding operation in step S950 (S955).

According to an exemplary embodiment of a method and an apparatus for transmitting and receiving signals in a communication system, a decoding operation for each of UL signals from UEs in a base station configured with a distributed antenna structure in the communication system can be performed a specific entity among a control device (e.g., central processing unit (CPU), etc.) and a plurality of distributed access points (APs).

According to an exemplary embodiment of a method and an apparatus for transmitting and receiving signals in a communication system, a decoding entity (decoding location) for each of UL signals can be determined through a simple signaling procedure between a control device and a plurality of distributed APs in the communication system, and the UL signals can be efficiently decoded. As a result, UL signal reception performance can be improved in the base station configured with the distributed antenna structure.

However, the effects that can be achieved by the exemplary embodiments of the method and apparatus for transmitting and receiving signals in a communication system are not limited to those mentioned above, and other effects not mentioned will be clearly understood by those skilled in the art to which the present disclosure belongs from the configurations described in the specification of the present disclosure.

The operations of the method according to the exemplary embodiment of the present disclosure can be implemented as a computer readable program or code in a computer readable recording medium. The computer readable recording medium may include all kinds of recording apparatus for storing data which can be read by a computer system. Furthermore, the computer readable recording medium may store and execute programs or codes which can be distributed in computer systems connected through a network and read through computers in a distributed manner.

The computer readable recording medium may include a hardware apparatus which is specifically configured to store and execute a program command, such as a ROM, RAM or flash memory. The program command may include not only machine language codes created by a compiler, but also high-level language codes which can be executed by a computer using an interpreter.

Although some aspects of the present disclosure have been described in the context of the apparatus, the aspects may indicate the corresponding descriptions according to the method, and the blocks or apparatus may correspond to the steps of the method or the features of the steps. Similarly, the aspects described in the context of the method may be expressed as the features of the corresponding blocks or items or the corresponding apparatus. Some or all of the steps of the method may be executed by (or using) a hardware apparatus such as a microprocessor, a programmable computer or an electronic circuit. In some embodiments, one or more of the most important steps of the method may be executed by such an apparatus.

In some exemplary embodiments, a programmable logic device such as a field-programmable gate array may be used to perform some or all of functions of the methods described herein. In some exemplary embodiments, the field-programmable gate array may be operated with a microprocessor to perform one of the methods described herein. In general, the methods are preferably performed by a certain hardware device.

The description of the disclosure is merely exemplary in nature and, thus, variations that do not depart from the substance of the disclosure are intended to be within the scope of the disclosure. Such variations are not to be regarded as a departure from the spirit and scope of the disclosure. Thus, it will be understood by those of ordinary skill in the art that various changes in form and details may be made without departing from the spirit and scope as defined by the following claims.

What is claimed is:

1. An operation method of a first access point (AP), the operation method comprising:
   transmitting, to a control device of a base station, channel information between the first AP and one or more user equipments (UEs) connected to the base station;
   receiving allocation information determined by the control device based on the channel information
   identifying a decoding entity to decode a uplink (UL) signal of each of the one or more UEs from among a plurality of APs and the control device, based on the allocation information;
   directly performing a decoding operation on a first UL signal received from a first UE among the one or more UEs, based on the allocation information; and
   transmitting, to the control device, a first report related to a result of the decoding operation on the first UL signal,
   wherein the allocation information includes information indicating the decoding entity to decode a UL signal of each of the one or more UEs, and
   wherein the base station includes the plurality of APs and the control device.

2. The operation method according to claim 1, wherein the transmitting of the channel information comprises:
   performing measurements on UL channels between the first AP and the one or more UEs;
   generating the channel information based on a result of the measurements on the UL channels; and
   transmitting the channel information to the control device.

3. The operation method according to claim 1, wherein the allocation information includes information instructing the first AP to decode a UL signal of at least the first UE among the one or more UEs.

4. The operation method according to claim 1, further comprising, when the first UL signal is successfully decoded,
   after transmitting the first report, receiving a first request from the control device; and
   transmitting a decoded first UL signal, which is a result of decoding the first UL signal, to the control device based on the first request.

5. The operation method according to claim 1, further comprising, when the first UL signal is not successfully decoded, after transmitting the first report, receiving a second request from the control device; and transmitting first information for the first UL signal to the control device based on the second request, wherein the first information is used by the control device to decode the first UL signal.

6. The operation method according to claim 5, wherein the first information corresponds to information of the first UL signal itself or information of a log-likelihood ratio (LLR) for the first UL signal.

7. The operation method according to claim 1, wherein the allocation information includes information instructing a second AP of the base station to decode a UL signal of a second UE among the one or more UEs, and the directly performing of the decoding operation on the first UL signal comprises:

receiving, from the control device, first decoding success information including information indicating that the second AP has successfully decodes a UL signal of the second UE;

transmitting, to the control device, a third request requesting information on a decoding result at the second AP;

receiving, from the control device, information on a decoding result of a second UL signal received by the second AP from the second UE; and decoding the first UL signal based on a successive interference cancellation (SIC) operation using the information on the decoding result of the second UL signal.

8. The operation method according to claim 1, further comprising, when the allocation information includes information instructing at least the first AP and a third AP of the base station to decode a UL signal of a third UE among the one or more UEs, after identifying the entity, receiving, from the control device, second decoding success information including information indicating that the third AP has successfully decoded a UL signal of the third UE; and determining that there is no need to perform decoding on a third UL signal received from the third UE based on the second decoding success information.

9. An operation method of a control device of a base station to which a distributed antenna structure is applied, the operation method comprising:

receiving, from a plurality of access points (APs) included in the base station, channel information between each of the plurality of APs and one or more user equipments (UEs)connected to the base station;

determining allocation information based on at least the channel information;

transmitting the allocation information to at least one of the plurality of APs; and receiving, from a first AP among the plurality of APs, a first report related to a result of a decoding operation on an uplink (UL) signal received from a first UE among the one or more UEs based on the allocation information, wherein the allocation information includes information indicating a decoding entity to decode a UL signal of each of the one or more UEs among the plurality of APs and the control device.

10. The operation method according to claim 9, wherein the determining comprises:

determining the allocation information based on at least part of the channel information, network configuration information, or monitoring information.

11. The operation method according to claim 10, wherein the network configuration information includes information on processing capacity for each AP, and the monitoring information includes information on fronthaul capacity between the control device and the APs.

12. The operation method according to claim 9, further comprising, when the first report indicates decoding success, after receiving the first report, transmitting, to the first AP, a first request requesting transmission of a decoding result of a UL signal received from the first UE; and receiving a decoded first UL signal based on the first request.

13. The operation method according to claim 9, further comprising, when the first report indicates decoding failure, after receiving the first report, transmitting, to the first AP, a second request requesting transmission of first information; and receiving, from the first AP, the first information transmitted based on the second request, wherein the first information is used by the control device to decode a UL signal from the first UE.

14. The operation method according to claim 9, further comprising, when the allocation information includes information instructing a second AP of the base station to decode a UL signal of a second UE among the one or more UEs, before receiving the first report, receiving, from the second AP, a second report indicating that the UL signal of the second UE has been successfully decoded;

transmitting first decoding success information based on the second report;

receiving, from the first AP, a third request requesting information on a decoding result at the second AP; and transmitting, to the first AP, information on a decoding result of a second UL signal received by the second AP from the second UE, wherein the information on the decoding result of the second UL signal is used by the first AP in a successful interference cancellation (SIC) operation for a decoding operation of a UL signal received from the first UE.

15. The operation method according to claim 9, further comprising, when the allocation information includes information instructing at least the first AP and a third AP of the base station to decode a UL signal of a third UE among the one or more UEs, after the transmitting, receiving, from the third AP, a third report indicating that a UL signal of the first UE has been successfully decoded; and based on the third report, transmitting second decoding success information to at least the first AP.

* * * * *